United States Patent [19]

Trumble

[11] 3,847,156
[45] Nov. 12, 1974

[54] SUTURE
[75] Inventor: William P. Trumble, Manchester, Mo.
[73] Assignee: Sherwood Medical Industries Inc., St. Louis, Mo.
[22] Filed: July 17, 1972
[21] Appl. No.: 272,619

[52] U.S. Cl............................... 128/335.5, 161/175
[51] Int. Cl............................................. A61l 17/00
[58] Field of Search .......... 128/335.5; 261/175, 176

[56] References Cited
UNITED STATES PATENTS

| | | | |
|---|---|---|---|
| 2,734,506 | 2/1956 | Nichols et al. | 128/335.5 |
| 3,443,374 | 5/1969 | Carnevale | 261/175 X |
| 3,463,652 | 8/1969 | Whitesel et al. | 161/175 X |
| 3,540,452 | 11/1970 | Usher et al. | 128/335.5 |

Primary Examiner—Dalton L. Truluck
Attorney, Agent, or Firm—Stanley N. Garber; William R. O'Meara

[57] ABSTRACT

A non-absorbable suture is provided which has a metallic multifilament core having a urethane polymer substantially filling the interstices between filaments, and an outer plastic coating covering and adhering to the urethane polymer. The suture may be prepared by impregnating a multi-filament core of stainless steel filaments, each of which may be about 25 microns in diameter, with a solution of urethane prepolymer and a solvent with a cure retardant. The prepolymer is cured in situ in an oven to produce a flexible urethane polymer, and then a plastic outer coating is applied which adheres to the polymer. The outer coating may be nylon in a solvent which leaves a coating upon evaporation of the solvent which is then fused to form a smooth outer surface.

13 Claims, 3 Drawing Figures

PATENTED NOV 12 1974  3,847,156

SUTURE

BACKGROUND OF THE INVENTION

This invention relates to sutures and more particularly to non-absorbable surgical sutures, and to the method of making the same.

In general, sutures should be formed of materials which do not react with the body, which have sufficient tensile strength, good handling qualities, such as knot retention and ease of tying, and which are incapable of transmitting infectious media along the suture by capillary or wicking action. Various types of sutures have been proposed in attempts to obtain a suture having these qualities, however, they have generally been deficient in one or more aspects. For example, while some previous sutures were physiologically inert and non-wicking, they exhibited other undesirable characteristics such as a relatively low ratio of tensile strength to diameter, or they were not sufficiently flexible and had poor handling characteristics and poor knot retention.

It is therefore an object of the present invention to provide a suture which has the above-mentioned desirable qualities while avoiding the above-mentioned deficiencies.

Another object of the present invention is to provide a surgical suture having a relatively high ratio of tensile strength to diameter and which exhibits a relatively high degree of flexibility.

Still another object is to provide a metallic multi-filament suture which is substantially non-wicking, is physiologically inert, and provides good handling and knot retention characteristics.

Still another object is to provide a novel method of making a suture of the above type.

In accordance with one form of the present invention a multi-filament core is provided with a urethane polymer impregnating the filaments, and a plastic coating which adheres to the urethane polymer. In accordance with another aspect of the invention a prepolymer of urethane in a solvent is applied to a multi-filament core to impregnate the core, the prepolymer is cured to provide a flexible urethane polymer, and an outer plastic coating is applied which adheres to the polymer.

These, as well as other features and advantages of the present invention will become apparent from the following detailed description and accompanying drawings.

DESCRIPTION OF THE PREFERRED EMBODIMENT

Figure 1:
FIG. 1 is a plan view of a portion of a suture according to the present invention.
Figure 2:
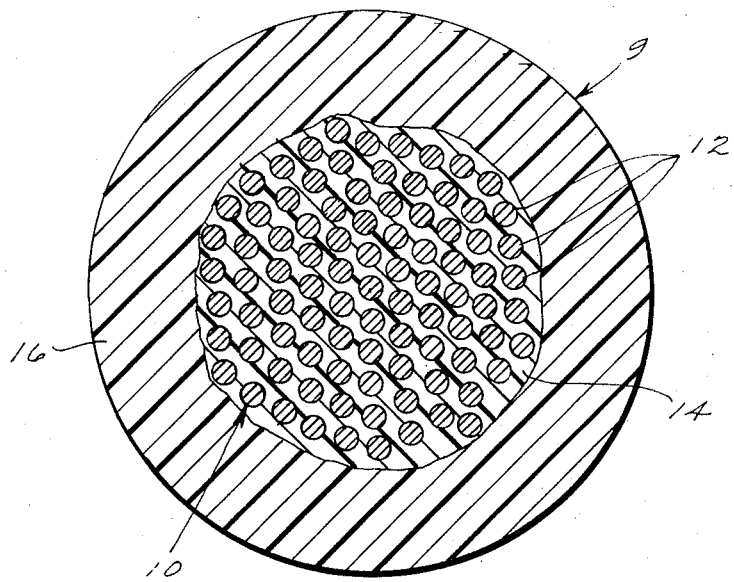
FIG. 2 is a cross-sectional view of the suture of FIG. 1.

Referring now to FIGS. 1 and 2 of the drawings, a surgical suture 9 is shown including a suture core 10 having a plurality of filaments or strands 12 providing a multi-filament core. The strands 12 are preferably formed of stainless steel, such as No. 304 stainless steel, although they can be formed of suitable nonmetallic materials such as nylon or dacron, or other metallic materials such as tantalum or niobium. The strands 12 are preferably about 30 microns or less in diameter, and twisted, braided, or woven along the length thereof. Suitable metallic filaments may be obtained from the Brunswick Corporation, Chicago, Ill., under the trademark Brunsmet.

The core 10 is shown impregnated with a flexible urethane polymer, indicated at 14, that is polymerized in situ. The polymer material 14 substantially fills the voids or interstices between the filaments to prevent the transmission of fluids, such as infectious fluids, through the core by capillary action.

An outer coating 16 of a suitable plastic material covers the impregnated core and adheres tenaciously to the urethane impregnant. Coating 16 is preferably formed of a polyamide, such as nylon terpolymer, although other plastic materials, for example, another coating of a urethane polymer similar to material 14 or a coating of polyethylene may be used. In any case, the outer surface of the outer coating 16 should be smooth, substantially non-irritating in use, and should not crack or separate from the polymer when the finished suture is folded or tied in a knot, and the nylon coating described hereinafter provides such a coating.

There is a very strong bond between the nylon coating 16 and the urethane polymer 14 since these materials are similar in chemical functionality. Also, it has been found that by bonding the outer plastic coating to the urethane polymer rather than directly to the core filaments, a superior bond between the core and outer coating is obtained.

Figure 3:
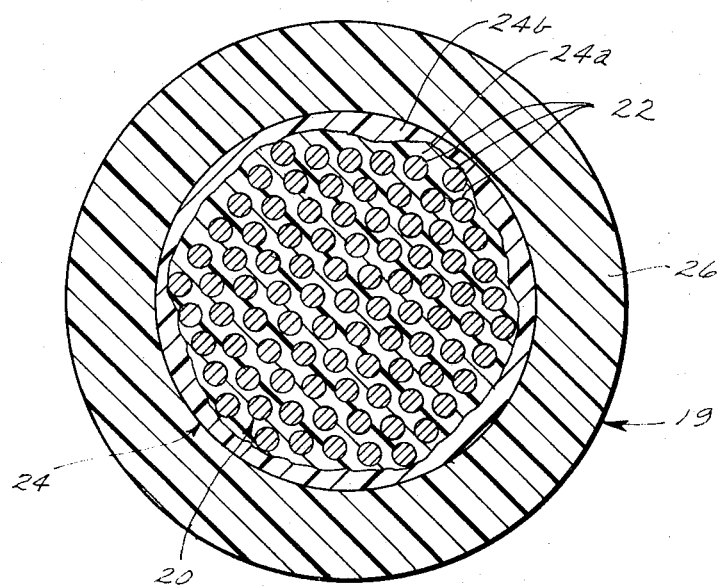
FIG. 3 is a cross-sectional view of suture in accordance with a modified embodiment.

In FIG. 3, a similar core 20 is shown including a plurality of twisted stainless steel filaments 22 impregnated by a urethane polymer indicated at 24. In this case, the polymer material 24 includes an impregnating coating or layer 24a and a radially outer peripheral coating or layer 24b of the same or similar material as coating 24a and adhering to the coating 24a. This additional layer 24b may be used where desired or required. It may be advantageously used, for example, where a solution of low viscosity is used during impregnation that may result in the first urethane polymer layer 24a leaving very thinly covered outer areas of the core 20. Disposed over the urethane polymer layer 24 is a plastic outer layer 26, preferably of nylon having a smooth outer surface. The second urethane polymer layer 24b insures total bonding between the outer plastic coating 26 and the urethane polymer rather than directly with the filaments.

Sutures in accordance with the invention have been made using filaments for the substrate or core having a diameter as small as 5 microns and with cores having various numbers of filaments, depending on the strength required and U.S.P. sizing. These very fine filaments produce a suture which is highly flexible and has excellent tying characteristics and knot retention, and the suture exhibits a high ratio of tensile strength to diameter and is very supple. Such sutures exhibited no tendency to transmit fluid by capillary action.

The drawing shows exaggerated diagramatical illustrations of sutures which are not necessarily drawn to scale or in relative proportions as to size or shape, and the number of filaments shown are meant to be illustrative only.

The urethane polymer coatings or impregnants 14 in FIG. 2, and 24 in FIG. 3 are formed of a urethane prepolymer that includes a polyol and a diisocyanate which chemically react during curing to provide an elastomer that is flexible and elastic. The cured urethane polymer preferably has a tensile strength of about 3,000 to 8,000 psi and exhibits an elongation of between about 300 to 700 percent before breaking, as taken in accordance with standard tests by the American Society of Testing and Materials (A.S.T.M.).

In a preferred method of making a suture in accordance with the invention, a twisted multi-filament core, for example, of a plurality of fine stainless steel filaments, are impregnated by applying thereto, such as by immersion, spraying, dipping, and passing the core through a smoothing opening or die, a urethane prepolymer in a suitable solvent. The prepolymer is preferably a polyester based aliphatic polyurethane, with a solvent such as methyl cellosolve. The prepolymer may consist of one part of an adduct of castor oil and three parts of methylenebis (phenyl isocyanate). A mixture of about 25 percent by weight of the above prepolymer in a solution including the solvent methyl cellosolve and a cure or polymerization retardant, such as xylol, have produced excellent results. The methyl cellosolve is preferably in a ratio of about six parts to one of the xylol and the solution preferably has a viscosity of between 4,000 and 12,000 cps, at 25°C (Brookfield).

By employing xylol in the prepolymer solution, relatively fast curing, for example, in a forced air oven, is possible while obtaining an even coating which is free of holes and areas of weakness that may otherwise occur due to the entrapment of solvent gasses that result from the material first drying on the surface. If permitted, such gasses cause bubbles that burst through the material causing an uneven coating. The use of xylol avoids such undesirable effects while permitting a practical, relatively short curing time.

If desired, after the impregnant is cured, for example, in an oven at 120°F, the same prepolymer and solvent in various suitable proportions may be applied to the impregnated core to provide as previously mentioned herein, another urethane layer, such as is represented in FIG. 3, at 24b. This additional layer 24b insures an even or complete covering of the core and insures that the outer plastic coating 26 will be smooth and bonded to the polymer rather than directly to the filaments, however, layer 24b is not necessary in many cases.

The core with the cured, flexible urethane polymer impregnating the filaments is now provided with the outer plastic coating 26, for example. a nylon coating. This coating may be applied by extrusion, immersion, dipping, a fluidized bed process, or by other suitable means. Preferably and advantageously, a solution, in the range of 10–65 percent by weight of nylon terpolymer, for example, of the 800 series, in a remainder of hot (120°C) solvent, such as dimethyl formamide is applied to the urethane polymer impregnated core. This solution may be applied, for example, by dipping, spraying, etc., and passing the impregnated core through a smoothing opening or die. Upon evaporation of the solvent, a powder-like or fine particle nylon coating is provided which adheres to the impregnated core and is evenly distributed thereon. The powder-like coating is then fused by heat, such as in a baffle furnace (e.g., 300°F for about 4 minutes) to provide an outer flexible nylon coating, such as indicated at 26, that has a smooth continuous outer surface.

As is well known to those skilled in the art, urethane polymers consist of a condensation reaction product of a polyol and a diisocyanate. The polyol can be a polyester type or a polyether type. For example, useful urethane polymers of the polyester type may be formed from the previously mentioned prepolymer including the polyol of an adduct of castor oil and methylenebis (phenyl isocyanate), or from a condensation of adipic acid with a one to three ratio of a diol mixture of trimethylol propane and butylene glycol reacted with a diisocyanate mixture of tolylene diisocyanate and trimethylol propane. Useful urethane polymers of the polyether type may be formed from a reaction product of polyethylene glycol polyol and methylene dianiline diisocyanate, or a reaction product of polypropylene glycol and polymethylene polyphenyl diisocyanate. The ratio of the polyol is diisocyanate will determine the tensile strength and flexibility of the finished suture, as will be apparent to those skilled in the art, and the ratio should be such so as to produce a flexible and preferably elastic urethane polymer. Also, various suitable solvents which are compatable with the particular prepolymer used will be apparent to those skilled in the art. Likewise, although nylon is preferred, various outer plastic coatings, other than those mentioned herein, that will provide a smooth, biomedically inert, adherent, flexible covering will be apparent to those in the art. The type of urethane polymer and the proportion of polyol to diisocyanate and the outer coating material are preferably chosen to produce a suture which is sufficiently supple such that when the suture is laid upon an object, it will drape over or hang from the object and generally conform to the outline or shape of the object by reason of gravity alone. In other words, the finished suture should have a suppleness somewhat similar to that of cotton or silk thread or string.

The following examples are given for purposes of illustration only and are not to be considered as limiting the invention.

Example 1:

A suture core was used having 90 strands of 304 stainless steel, each strand having a diameter of 25 microns, the core having five twists per inch, and providing a core diameter of about 8.5 mils. The core was passed through a solution of 10 percent (by weight) of polyester based aliphatic polyurethane prepolymer (Alpha-841 from Baker Castor Oil Co., Bayonne, N.J.) with the remainder of the solution (90 percent) consisting of 6 parts of the solvent methyl cellosolve to one part of cure retardant xylol. Typical properties of this prepolymer are a tensile strength of 7,000 psi and 510 percent elongation before breaking (ASTM), Sward Hardness (1 day) of 13, and an uncured viscosity of 10,000 cps at 25°C (Brookfield). The impregnated core was passed through an air oven at a temperature of about 225°F for about 5 minutes to effect curing. A solution consisting of 20 percent of nylon terpolymer of the 800 series (BCI 651-Belding Chemical Industries of New York, N.Y.) and 80 percent hot (120°C) solvent of dimethyl formamide was applied to the urethane coated core and passed through a smoothing die. The coating was dried in an oven at about 180°F for about 2 minutes to produce a nylon powder-like even coating. Next the nylon coating was fused in an oven at about 300°F for about 4 minutes to provide an outer flexible nylon coating tenaciously adhereing to the urethane polymer coating and having a smooth outer surface. The finished suture had an outer diameter of 13 mils. The tensile failure strength (Scott Testor) was 13 lbs. and knot retention failure was 6.5 lbs. The suture exhibited good handling qualities.

Example 2:

A 16 mil core having 300 strands of 25 micron 304 stainless steel with five twists per inch was impregnated with a solution consisting of 25 percent of the prepolymer used in Example 1 and the 75 percent remainder consisting of six parts methyl cellosolve to one part xylol. After curing for about 3 minutes at 180°F, a solution of 40 percent nylon terpolymer (800 series) and 60 percent dimethyl formamide was applied by dripping and was dried to a powder-like coating that was then fused at 320°F for about 4 minutes to provide an outer nylon coating. The diameter of the finished suture was 21.97 mils. Using a tensiometer (Instron) the tensile (straight pull) strength failure was 48 lbs. and the knot retention failure about 22 lbs. The suture also exhibited good handling characteristics.

Example 3:

A 4 mil diameter core having 90 strands, five twists per inch, of 12 micron each and of 304 stainless steel was impregnated with the same prepolymer, solvent and cure retardant of Example 1. After curing for about 3 minutes at 200°F, the core with the curved urethane polymer was subjected to a second similar prepolymer solution but one having 25 percent prepolymer and the 75 percent remainder consisting of six parts methyl collosolve to one part of xylol. After the second coating was cured at about 230°F (peak) for about 30 seconds and slowly cooled to 90°F, a solution of 35 percent nylon terpolymer (800 series) and 65 percent dimethyl formamide was applied, dried to a powder-like coating form, and then fused at 265°F for about 3 minutes to a smooth coating. The outer diameter of the suture was 6.63 mils and had a tensile strength failure at 5.4 lbs. and a knot retention failure at 3.4 lbs. This suture also exhibited good handling qualities.

All the sutures resulting from the above-mentioned examples show no tendency to transmit fluids by capillary action, were non-fraying when cut, and have a high degree of flexibility. Similar successful tests were made in which each strand had a diameter of 5 microns and which produced a suture having a very high degree of flexibility and a high ratio of tensile strength to diameter.

The same procedures indicated in the above examples may be used where non-metallic filaments, such as nylon, are used instead of the stainless steel filaments.

While there has been shown and described preferred forms of the invention herein, it will be understood that various changes and modifications thereto may be made without departing from the spirit and scope of the invention.

What is claimed is:

1. A surgical suture comprising a core including a plurality of metallic filaments, an impregnant including a flexible urethane polymer impregnating said core and filling all of the interstices between said filaments for preventing capillary transmission of infectuous fluids along the suture, and an outer flexible plastic coating adhered to said impregnant and having a smooth outer surface.

2. The surgical suture according to claim 1 wherein each of said filaments has a diameter between about 5 microns and 30 microns.

3. The surgical suture according to claim 2 wherein each of said filaments is stainless steel.

4. The surgical suture according to claim 1 wherein said urethane polymer comprises a polymerized in situ solution including a prepolymer of urethane and a solvent.

5. The surgical suture according to claim 4 wherein said solution includes a polymerization retardant.

6. The surgical suture according to claim 5 wherein said retardant is xylol.

7. The surgical suture according to claim 4 wherein said prepolymer comprises a polyester based aliphatic polyurethane.

8. The surgical suture according to claim 4 wherein said solvent comprises methyl cellosolve.

9. The surgical suture according to claim 4 wherein each of said filaments has a diameter less than 30 microns, and said plastic coating is nylon.

10. The surgical suture according to claim 1 wherein said plastic coating is a polyamide layer.

11. The surgical suture according to claim 1 wherein said plastic coating is a nylon terpolymer covering said impregnant and defining the radially outward surface of the suture.

12. The surgical suture according to claim 1 wherein said plastic coating is another urethane polymer layer.

13. The surgical suture according to claim 12 further comprising an outer nylon layer adhering to said other urethane polymer layer.

* * * * *